Patented Aug. 25, 1925.

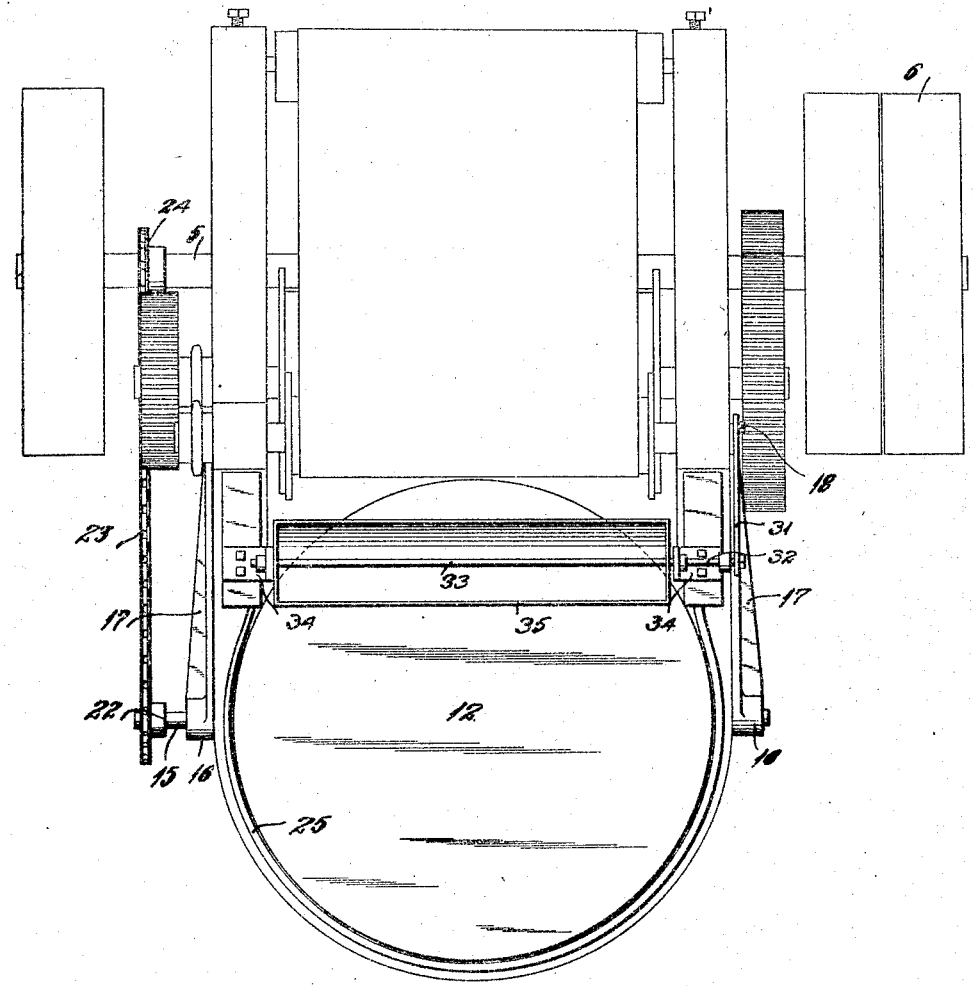

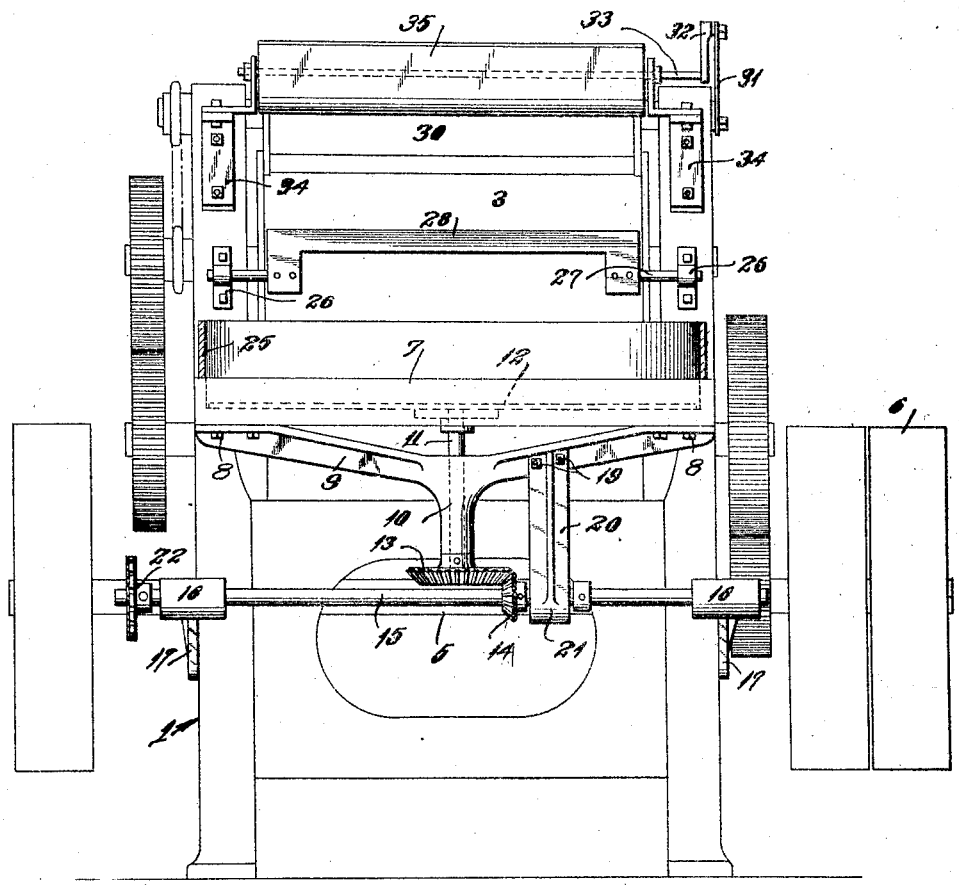

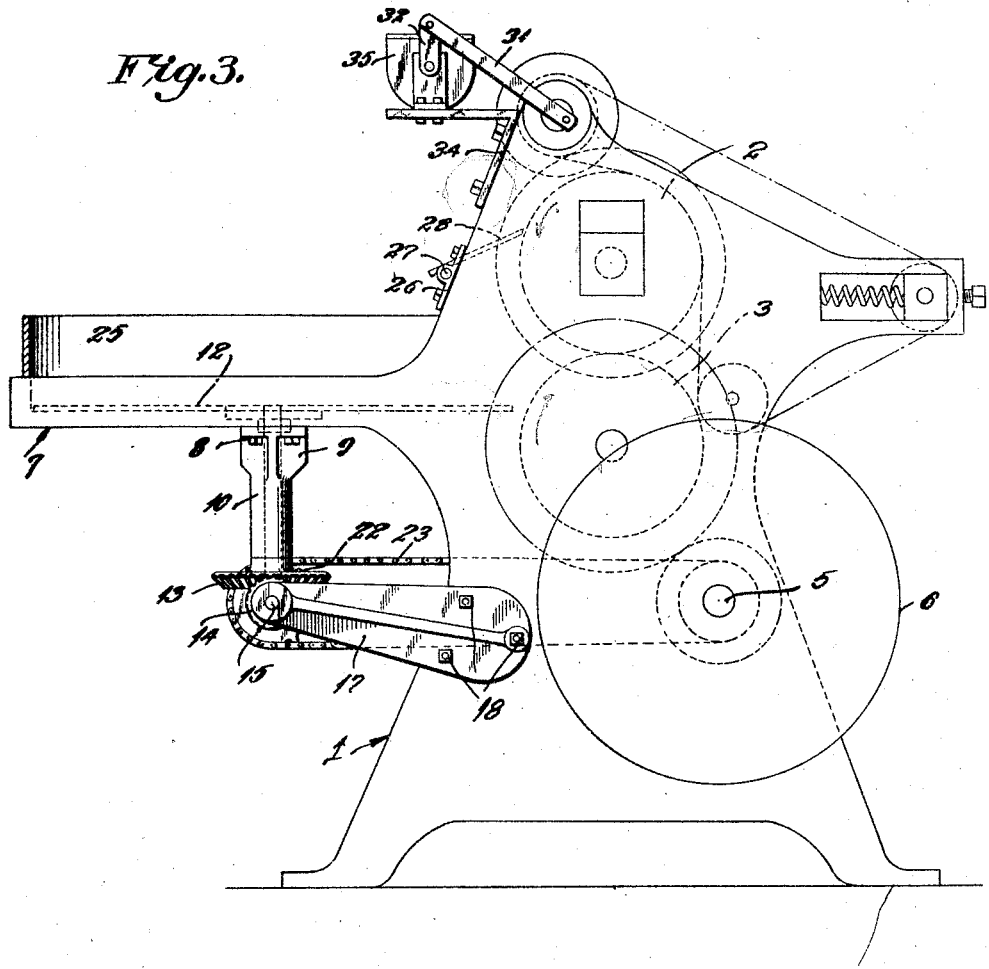

1,551,131

UNITED STATES PATENT OFFICE.

GUSTAVE A. BOHNET, OF SAN ANTONIO, TEXAS, ASSIGNOR TO W. S. AMIDON AND EDWIN SCHAUMBURG, BOTH OF ST. LOUIS, MISSOURI.

AUTOMATIC DOUGH BRAKE.

Application filed December 15, 1923. Serial No. 680,828.

*To all whom it may concern:*

Be it known that I, GUSTAVE A. BOHNET, a citizen of the United States, and resident of San Antonio, in the county of Bexar and State of Texas, have invented certain new and useful Improvements in Automatic Dough Brakes; and I do hereby declare that the following is a full, clear, and exact description thereof.

My invention relates to improvements in dough brake machines commonly used by bakers and in which it is necessary to turn the sheet of rolled dough at an angle before the same passes back through the machine, by doing this it has been found that texture and quality of the loaf has greatly been improved.

Heretofore, it has been the custom in machines of this type to secure thereto a stationary table or shelf upon which the dough falls as it passes through the machine. In this type the operator lifts and turns the dough upon the table by hand before again passing it through the machine. This has been found a very laborious task to the operator. Furthermore, in some machines the table has been so arranged as to permit the same to be freely rotated by hand, even this does not remove from the operator the trouble of turning the dough.

It is therefore the object of my invention to provide a table adapted to be carried by a machine of the class described wherein the dough as it falls from the machine is automatically turned to a position permitting it to again pass through the machine at an angle to its original roll.

A further object of my invention is to provide a table so mounted upon the machine and connected to the operating element of the latter that the same will be rotated upon the operation of the machine.

Another object of my invention is to provide a table for the purpose described having a guard around its periphery to prevent the dough from being thrown off as the movement of the table takes place.

In the accompanying drawings:

Figure 1 is a top plan view of a dough brake machine the same having mounted thereon my improved table.

Figure 2 is a front elevation of the same, and

Figure 3 is a side elevation.

Referring to the drawings in detail, wherein like reference characters denote corresponding parts throughout the several views, the numeral 1 designates the frame of a brake machine, of the usual character, the same having coacting rolls 2 and 3 which are provided with engaging gears driven from a main shaft 5. If so desired, the main shaft 5 may be driven by a motor, but in the accompanying drawings I have shown the same as having a driving pulley 6 keyed thereto. As my invention relates to improvements in the table carried by the machine, I will not go into detail description of the machine, as the table may be applicable to any type of machine.

To the under portion of the usual stationary table 7 I have secured thereto, by the bolts 8, a yoke member 9 having a vertical tubular portion 10 through which passes a shaft 11. The upper end of the shaft 11 has secured thereto in any suitable manner a circular table 12 which is adapted to fit within a cut out portion formed in the upper face of the table 7. The lower end of the shaft 11 has keyed thereto a bevel gear 13 which meshes with a second gear 14 keyed to a horizontal shaft 15. The shaft 15 is supported within bearings 16 carried at the end portions of arms 17 secured to the sides of the frame 1 of the machine, as indicated at 18.

In order to support the shaft 15 in such a manner that the gear carried thereby will at all times be in mesh with the gear 12, I have secured to the yoke 9, as indicated at 19, a downwardly extending arm 20 the same having at its lower end a suitable bearing 21 to receive therein the shaft 15.

In order to cause the rotation of the shaft 15 when the machine is set in operation I have keyed to one end of the shaft a sprocket wheel 22 around which a chain 23 passes from a second sprocket wheel 24 keyed to the main shaft 5 of the machine.

As disclosed in the drawings the table 7 has formed integral therewith, if so desired, a vertically extending flange 25 which is adapted to prevent the dough from being thrown off the table as the same rotates.

Carried by the side walls of the frame 1 of the machine are brackets 26 adapted to receive for rotary movement therein arms 27 secured to a scraper 28 which engages the upper roll 3 to remove therefrom the dough and cause the same to fall upon the table 12.

From the foregoing description it will be readily seen that as the machine is put in operation the scraper 28 will remove from the roll 3 the sheet of rolled dough, whereby causing the same to fall upon the rotary table 12 and after the dough has freed itself from the rolls the table has revolved sufficiently to again permit the dough to be fed in between the rolls by hand.

Referring to the drawings, it will be noted that I have disclosed a brake machine having therein an endless belt to assist in the carrying of the dough from one roll to the other and at the upper portion of the machine is arranged a belt roller 30 which is driven by a suitable connection to one of the main rolls. The roller 30 has eccentrically connected thereto a pitman 31 which is connected to the crank portion 32 of a rock shaft 33 mounted in suitable brackets, indicated in general at 34, upon the frame of the machine. The shaft 33 has carried thereby a flour receiving trough 35 which is oscillated upon the movement of the shaft 33, thereby dropping upon the dough as it passes from the machine a desired amount of dusting flour.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described my invention, what I claim as new and desire to secure by Letters Patent, is:—

1. A machine of the class described having a pair of coacting rolls adapted to roll out a batch of dough, a table mounted for rotary movement in a horizontal plane positioned in front of said rolls and adapted to receive a batch of dough from the machine, and said table rotating to permit the feeding of the dough back through the machine at an angle to its first roll.

2. A machine of the class described having a pair of coacting rolls adapted to roll out a batch of dough, a rotary table positioned in front of said rolls adapted to receive thereon the dough prior to its passage through the machine, said table receiving thereon the dough after its passage through the machine, and means for rotating said table to permit the dough thereon to be fed back through the machine at an angle to its first roll.

3. A machine of the class described having a pair of coacting rolls adapted to roll out a batch of dough, a table mounted for rotary movement upon said machine, a scraper engaging one of said rolls to remove therefrom the dough and deposit the same upon said table, and means connecting said table with said machine for rotating the same upon the operation of the machine.

In testimony that I claim the foregoing I have hereunto set my hand at San Antonio, in the county of Bexar and State of Texas.

GUSTAVE A. BOHNET.